(12) United States Patent
Bushnell

(10) Patent No.: US 8,646,729 B2
(45) Date of Patent: *Feb. 11, 2014

(54) DEPLOYABLE AERODYNAMIC DEVICES WITH REDUCED ACTUATOR LOADS

(75) Inventor: Glenn S. Bushnell, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/150,334

(22) Filed: Jun. 1, 2011

(65) Prior Publication Data

US 2011/0226345 A1    Sep. 22, 2011

Related U.S. Application Data

(63) Continuation-in-part of application No. 11/953,672, filed on Dec. 10, 2007, now Pat. No. 7,954,769.

(51) Int. Cl.
*B64C 9/00* (2006.01)
(52) U.S. Cl.
USPC .......................... 244/201; 244/213; 244/204.1
(58) Field of Classification Search
USPC ............ 244/200.1, 201, 204, 204.1, 213, 215
See application file for complete search history.

(56) References Cited

U.S. PATENT DOCUMENTS

| | | | | |
|---|---|---|---|---|
| 1,924,871 A * | 8/1933 | Townsend | ...................... | 114/130 |
| 2,805,031 A * | 9/1957 | Lee et al. | ...................... | 244/201 |
| 4,566,657 A * | 1/1986 | Grow | ........................... | 244/90 A |
| 6,079,672 A * | 6/2000 | Lam et al. | ...................... | 244/217 |
| 6,554,229 B1 * | 4/2003 | Lam et al. | ...................... | 244/217 |

* cited by examiner

*Primary Examiner* — Philip J Bonzell
(74) *Attorney, Agent, or Firm* — Ostrager Chong Flaherty & Broitman P.C.

(57) ABSTRACT

Deployable aerodynamic devices with reduced actuator loads, and related systems and methods are disclosed. An external flow system in accordance with a particular embodiment includes an external flow body, a deployable device carried by and movable relative to the external flow body, and a coupling connected between the external flow body and the deployable device. The system can further include an actuator device operatively coupled between the external flow body and the deployable device, with the actuator device positioned to move the deployable device along a motion path between a stowed position and the deployed position. The motion path can have a first portion over which the load delivered by the actuator device increases as the deployed device moves toward the deployed position, and a second portion over which the load delivered by the actuator device decreases as the deployed device moves toward the deployed position.

22 Claims, 8 Drawing Sheets

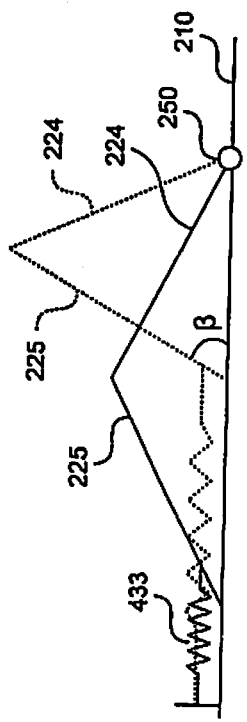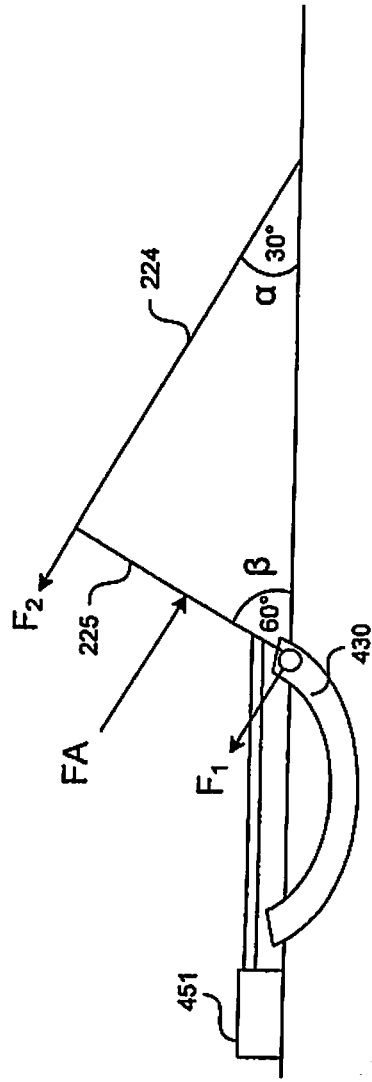

DEPLOYABLE AERODYNAMIC DEVICES WITH REDUCED ACTUATOR LOADS

RELATED APPLICATION

This application is a continuation-in-part of and claims priority from U.S. patent application Ser. No. 11/953,672 filed on Dec. 10, 2007.

TECHNICAL BACKGROUND

Aspects of the present disclosure are directed generally to deployable devices (e.g., aerodynamic devices) with reduced actuator loads, and related systems and methods.

BACKGROUND

Deployable leading and trailing edge devices have been used for many years to control the attitude and lift/drag characteristics of modern aircraft. In particular, conventional trailing edge ailerons located on the left and right aircraft wings are deployed asymmetrically to roll the aircraft. Conventional trailing edge flaps are generally deployed symmetrically to create high-lift wing configurations suitable for landing and take-off. The flaps are then stowed for more efficient operation at cruise conditions. Conventional leading edge devices (e.g., leading edge slats) may also be deployed for landing and take-off, and then stowed at cruise conditions.

One drawback associated with many conventional leading and trailing edge devices is that the actuators that power these devices tend to be large so as to overcome the aerodynamic forces acting against the devices as the devices are deployed into the adjacent airstream. Large devices are difficult to integrate into the aircraft, and the weight of such devices reduces the efficiency of the aircraft. In addition, large actuators consume a significant amount of power and can accordingly further reduce the efficiency of the aircraft. Accordingly, there is a need for deployable aerodynamic devices that are smaller and/or more efficient than conventional devices.

SUMMARY

The present disclosure is directed generally toward deployable devices (e.g., aerodynamic devices) with reduced actuator loads, and related systems and methods. An aircraft system in accordance with a particular embodiment includes a lifting body and a deployable aerodynamic device carried by and moveable relative to the lifting body. The aerodynamic device can include a first component pivotably coupled to the lifting body, and a second component movably coupled to the lifting body. The first and second components can be pivotably coupled to each other. The system can further include an actuator device coupled to the aerodynamic device and positioned to move the aerodynamic device relative to the lifting body between a stowed position and a deployed position, with the aerodynamic device being exposed to an adjacent airstream when in the deployed position.

The foregoing arrangement of components can allow the aerodynamic forces acting on the deployable device to reduce the load required by the actuator device to deploy the deployable device. For example, in another embodiment, an external flow system includes an external flow body (e.g., an airfoil or other lifting body), a deployable device (e.g., an aerodynamic device) carried by and moveable relative to the external flow body, and a coupling connected between the external flow body and the deployable device. An actuator device can be operatively coupled between the external flow body and the deployable device and can be positioned to move the deployable device between a stowed position and a deployed position. The motion can have a first portion over which the load delivered by the actuator device increases as the deployed device moves toward the deployed position, and a second portion over which the load delivered by the actuator device decreases as the deployed device moves toward the deployed position. The first portion of the motion is between the stowed position and the second portion of the motion. In a further particular embodiment, the deployed position is one of multiple deployed positions, and the actuator device provides a peak load at a point during the motion between the stowed position and the deployed position furthest from the stowed position.

One aspect of the invention is an external flow system, comprising: an external flow body; a deployable fluid dynamic device carried by and movable relative to the external flow body, the fluid dynamic device comprising a first panel pivotably coupled to the external flow body, and a second panel movably coupled to the external flow body and pivotably coupled to the second panel; and an actuator coupled to the external flow body and one of the first and second panels and having first and second operational states. The fluid dynamic device is in a stowed configuration when the actuator is in the first operational state and in a deployed configuration when the actuator is in the second operational state. The second panel is subjected to pressure exerted by fluid when the fluid dynamic device is not in the stowed configuration and the external flow body moves relative to that fluid in a direction such that the second panel leads the first panel.

Another aspect of the invention is a method for equipping an external flow body with a deployable fluid dynamic device, comprising: pivotably coupling a first panel of the deployable fluid dynamic device to a second panel of the deployable fluid dynamic device; pivotably coupling the first panel to the external flow body; movably coupling the second panel to the external flow body; and pivotably coupling a linear actuator to the external flow body and the second panel, the linear actuator being extendible to cause the first panel to move from a first position to a second position relative to the external flow body and to cause the second panel to move from a third position to a fourth position relative to the external flow body. The first and second panels and the linear actuator are arranged so that the deployable fluid dynamic device is in a stowed configuration when the first panel is in a first position and the second panel in the third position, and in a deployed configuration when the first panel is in the second position and the second panel is in the fourth position. The second panel is subjected to pressure exerted by fluid when the deployable fluid dynamic device is not in the stowed configuration while the external flow body is moving relative to that fluid in a direction such that the second panel leads the first panel.

A further aspect of the invention is an external flow system, comprising: an external flow body; a deployable fluid dynamic device carried by and movable relative to the external flow body, the fluid dynamic device comprising first and second panels pivotably coupled along a common axis to the external flow body, and a third panel disposed between the first and second panels and movably coupled to the external flow body; and an actuator device attached to the first, second and third panels and having activated and non-activated states, wherein the actuator device, when activated, causes the first and second panels to rotate in one direction relative to the external flow body and at the same time causes the third panel to rotate in an opposite direction and displace relative to external flow body. The fluid dynamic device is in a stowed configuration when the actuator device is in the non-activated state and in a deployed configuration when the actuator device is in the activated state.

Yet another aspect of the invention is a method for equipping an external flow body with a deployable fluid dynamic device, comprising: pivotably coupling first and second panels of the deployable fluid dynamic device to the external flow body; coupling the first panel to a third panel of the deployable fluid dynamic device using a first rotary actuator; coupling the second panel to the third panel using a second rotary actuator; and movably coupling the third panel to the external flow body. The first, second and third panels and the first and second rotary actuators are arranged so that activation of the first and second rotary actuators causes the first and second panels to rotate in one direction relative to the external flow body and at the same time causes the third panel to rotate in an opposite direction and displace relative to external flow body, thereby deploying the deployable fluid dynamic device.

Other aspects of the invention are disclosed and claimed below.

BRIEF DESCRIPTION OF THE DRAWINGS

FIG. 4A schematically illustrates a deployable device having a resilient element that applies a force tending to restore the device to the stowed position in accordance with an embodiment.

FIG. 4B schematically illustrates a deployable device having a translating coupling forming a curved guide path in accordance with another embodiment.

Reference will hereinafter be made to the drawings in which similar elements in different drawings bear the same reference numerals.

DETAILED DESCRIPTION

Aspects of the present disclosure are directed generally to deployable devices with reduced actuator loads, and related systems and methods. Representative deployable devices are described below in the context of aircraft installations (e.g., fixed-wing aircraft and rotorcraft), though in other embodiments, the devices can be installed on other external flow bodies. Several details describing structures or processes that are well known and often associated with such systems and methods are not set forth in the following description for purposes of brevity. Moreover, although the following disclosure sets forth several representative embodiments of systems and methods that can include actuators with reduced load requirements, several other embodiments can have different configurations and/or different components than those described in this section. Accordingly, such embodiments may include additional elements and/or may eliminate one or more of the elements described below with reference to FIGS. 1-8.

Figure 1:
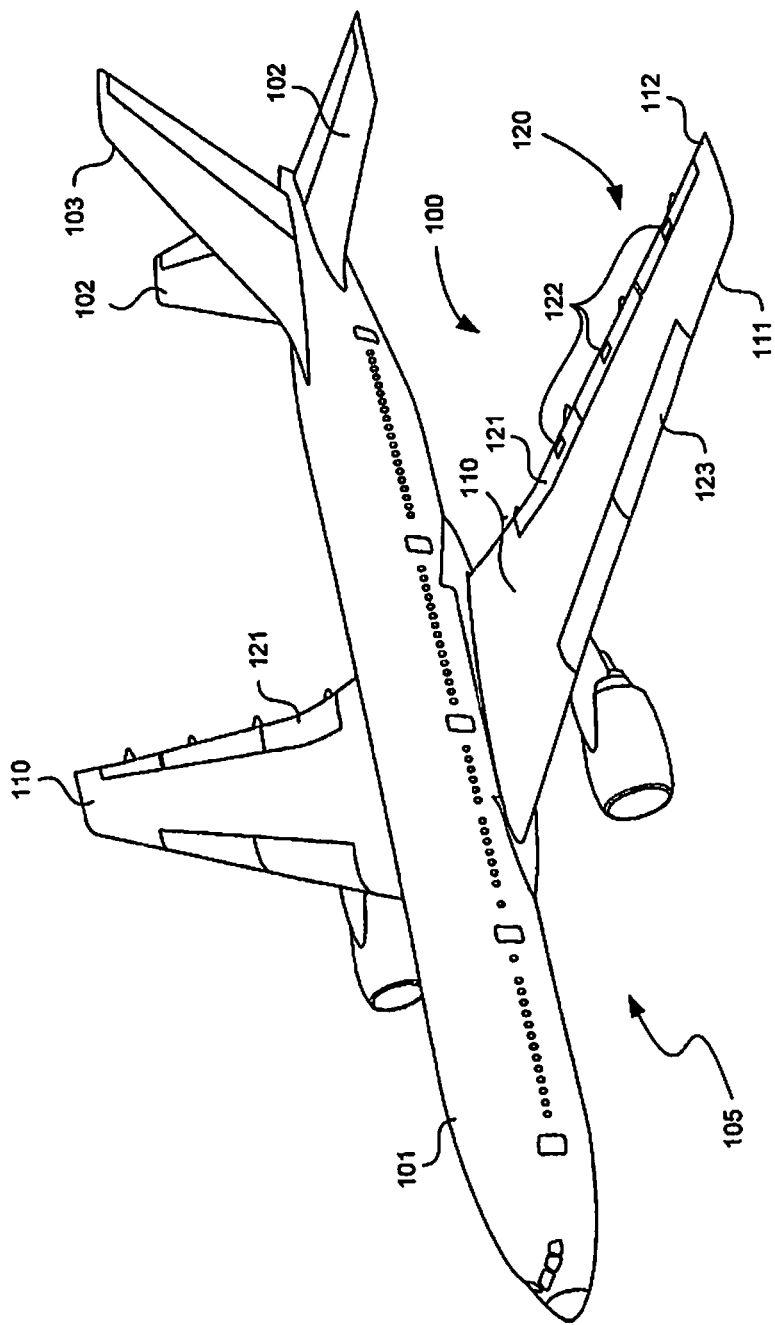
FIG. 1 is an isometric illustration of an aircraft having a system installed in accordance with any one of the embodiments disclosed hereinafter.

FIG. 1 is an isometric illustration of an aircraft 105 that includes a fuselage 101, wings 110, horizontal stabilizers 102, and a vertical stabilizer 103. The wings 110 can each include a leading edge 111 and a trailing edge 112, with aerodynamic devices 120 carried by and deployed from the wings 110. The aerodynamic devices 120 can include trailing edge devices 121, "mini"-trailing edge devices 122 carried by the trailing edge devices 121, and/or leading edge devices 123. The aerodynamic devices 120, together with other supporting components, can form an overall system 100 that is used to control the aerodynamic behavior of the aircraft 105. Representative embodiments of aerodynamic devices and associated methods suitable for the wing 110 and/or other external flow surfaces (e.g., the horizontal stabilizer 102 and/or vertical stabilizer 103) are described further below with reference to FIGS. 2-8.

Figure 2:
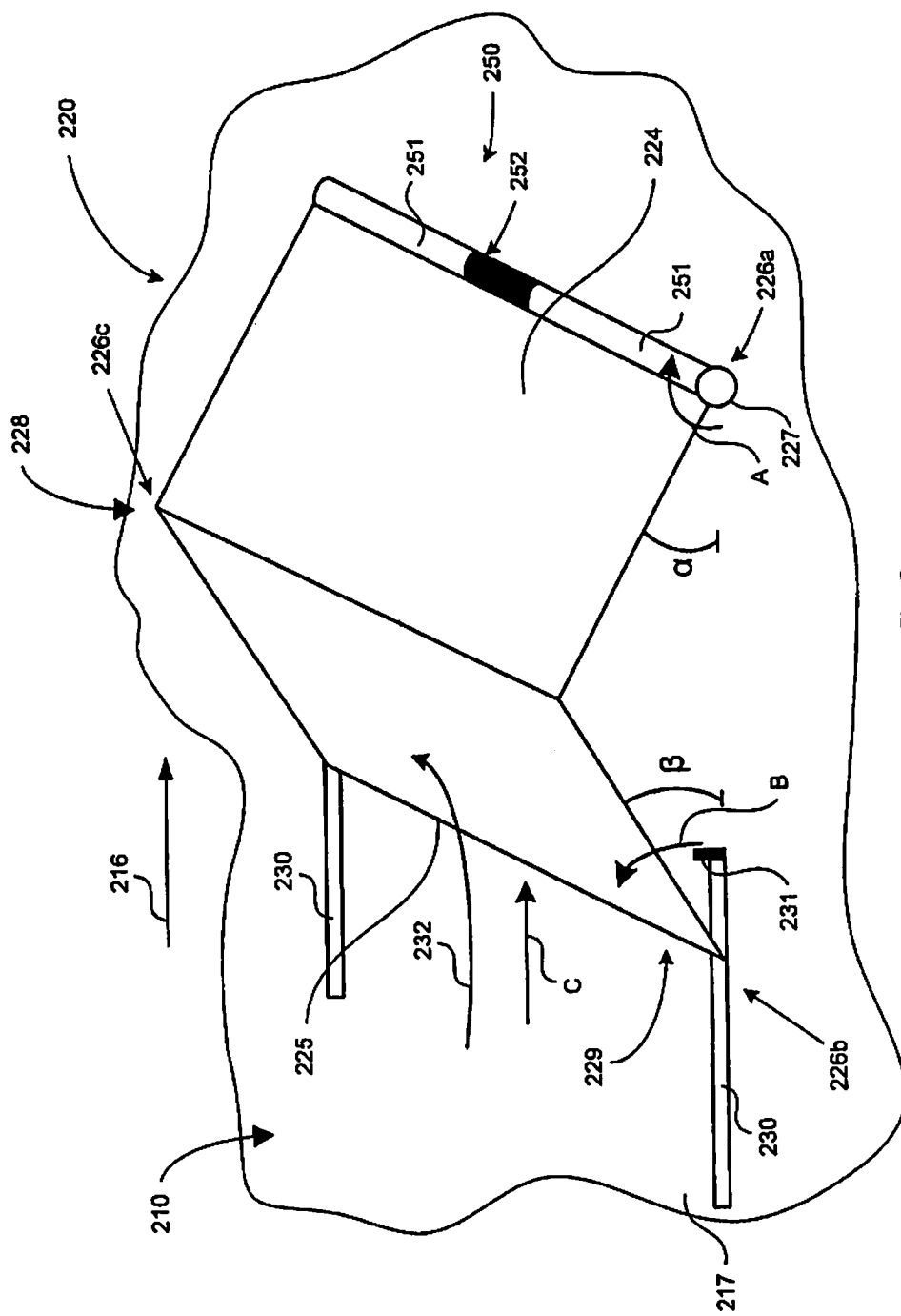
FIG. 2 is a partially schematic, isometric illustration of a deployable device configured in accordance with one embodiment.

FIG. 2 is a schematic, isometric illustration of a deployable device 220 carried by an external flow body 210, a portion of which is shown in FIG. 2. The external flow body 210 can be immersed in an external flow 216, e.g., an airflow or other fluid flow. The deployable device 220 can include a first component 224 coupled to a second component 225. When stowed, the first and second components 224, 225 can lay flat, e.g., generally parallel to and/or flush with an exposed surface 217 of the external flow body 210. When deployed, as shown in FIG. 2, the outer or wetted surface of the second component 225 (and to a lesser extent, the first component 224) can modify the fluid flow over the external flow body 210 to provide a desired effect. For example, if the exposed surface 217 is a wing upper surface, the second component 225 can operate as a speed brake in the position shown in FIG. 2. If the exposed 217 surface is a wing lower surface, the second component 225 can enhance the lift of the external flow body 210, operate as an aileron, and/or provide a trim function. If the exposed surface 217 is a helicopter rotor blade, the second component 225 can operate as a noise reduction device. These and other representative installations of the deployable device 220 are described in further detail later.

In a particular embodiment shown in FIG. 2, the first component 224 is hingedly (e.g., pivotably) coupled to the external flow body 210 at a first location 226a via a hinge joint 227. The second component 225 is translatably (e.g., slidably) coupled to the external flow body 210 at a second location 226b via a translating (e.g., sliding) coupling 229. The translating coupling 229 can include one or more guide paths 230 (e.g., linear guide paths) that guide the motion of a portion of the second component 225. The guide paths 230 can include channels, rails or other suitable structures. The coupled portion of the second component 225 can slide, roll (via one or more rollers or linear bearings) or otherwise move along the guide paths 230. One or more stops 231 (one of which is visible in FIG. 2) can stop the motion of the second component 225 at a pre-selected location, e.g., corresponding to a maximum deployed position.

The second component 225 can be hingedly (e.g., pivotably) coupled to the first component 224 at a third location 226c via a second hinge joint 228. The second hinge joint 228 can be located at the edges of both the first and second components 224, 225, or at other locations of these components. In a particular aspect of an embodiment shown in FIG. 2, the first component 224 acts to drive the second component 225. Accordingly, the first component 224 can be coupled to an actuator device 250. In a particular embodiment, the actuator device 250 includes one or more rotary actuators 251 (two are shown in FIG. 2) connected between the first component 224 and an attachment point 252 at the external flow body 210. When actuated, the actuator device 250 rotates the first component 224, as indicated by arrow A through angle α. This in turn causes a portion of the second component 225 to move from left to right, as indicated by arrow C, and to rotate relative to the external flow body 210 as indicated by arrow B, through angle β. Accordingly, the second component 225 moves along a motion path 232.

As the second component 225 moves along the motion path 232, the projected area of the second component 225 in a plane normal to the direction of the external flow 216 increases. Accordingly, the dynamic pressure acting on the second component 225 also increases. A component of the force provided by the dynamic pressure can act in parallel with the motion path 232 to reduce the load required by the actuator device 250 as it moves the second component 225 to one or more deployed positions.

Figure 3A:
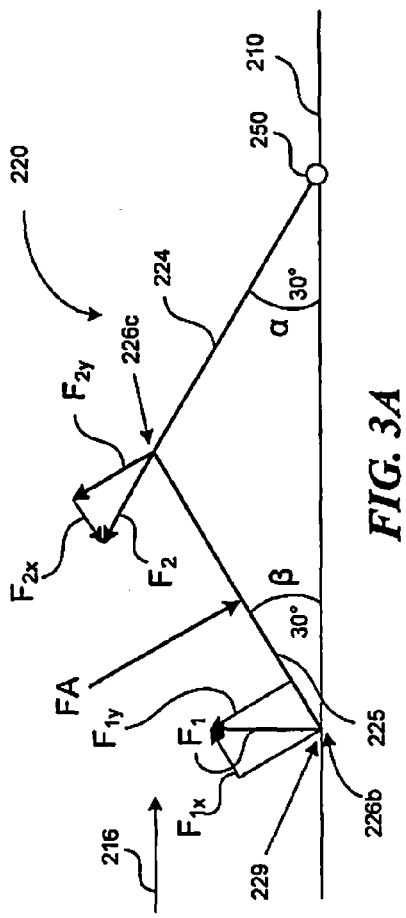
FIG. 3A is a graph illustrating actuator load as a function of deployment angle for a deployable device configured in accordance with a particular embodiment.
Figure 3B:
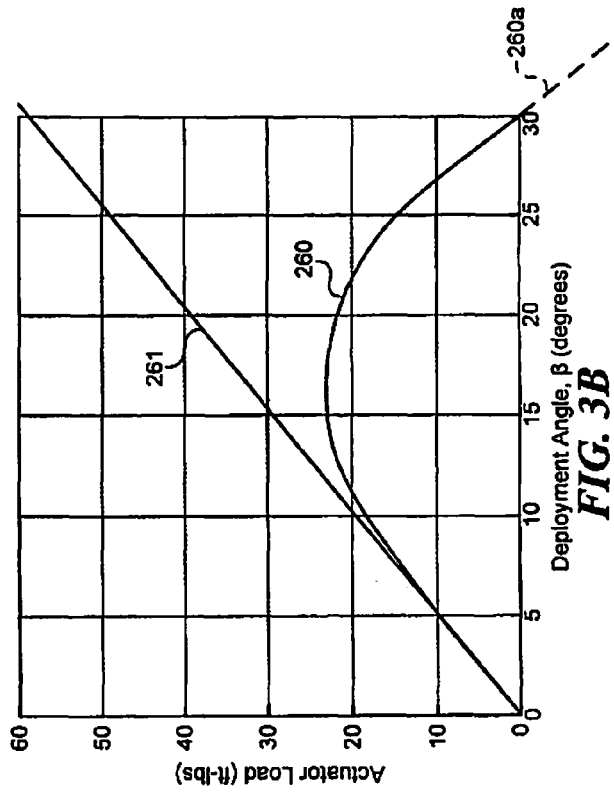
FIG. 3B is a representative force diagram illustrating forces on a deployable device at an equilibrium point in accordance with an embodiment.

FIG. 3A illustrates the forces on the second component 225 when angles α and β are 30°, in accordance with a particular embodiment. FIG. 3B is a graph illustrating the load put out by the actuator device 250 (shown by line 260) as a function of the deployment angle β shown in FIG. 3A. The load is represented in FIG. 3B as a torque (for a rotary actuator), and can have other dimensions in other embodiments, depending upon the actuator type. For purposes of comparison, the actuator load required for a conventional device having the same dimensions as the second component 225 is also shown in FIG. 3B by line 261. The conventional device is represented by a single flat panel that is rotatable about a hinge line and is driven by a rotary actuator located at the hinge line. The data provided in FIG. 3B assumes that the aerodynamic load provided by the dynamic pressure of the external flow 216 acts at the center of the second component 225 and that the aerodynamic load increases proportionally with the projected frontal area (e.g., the area facing directly upstream) presented by the second component 225. It is also assumed for purposes of this calculation that the first component 224 does not receive a significant amount of aerodynamic loading.

As shown in FIG. 3B, a conventional device typically requires a linearly increasing actuator load that continues to increase throughout the deployment range (see line 261). By contrast, a deployable device 225 in accordance with an embodiment can require an increasing actuator load over only a portion of its motion (e.g., from about 0° to about 17° shown in FIG. 3B), but then the load required of the actuator device 250 decreases because a portion of the increased aerodynamic load placed on the second component 225 by the external flow 216 acts along the motion path 232 (FIG. 2). In this particular arrangement, the required actuator load decreases to zero at 30° of deployment, at which point the second component 225 is in an equilibrium position. If the second component 225 were deployed further (as indicated by dashed line 260a), the actuator device 250 would be subjected to a negative load. Put another way, beyond 30°, the actuator device 250 acts to resist further motion of the second component 225 toward the deployed position. Alternatively, the actuator device 250 can be configured to be overridden by the aerodynamic force applied by the external flow 216 so as to allow the second component 225 to quickly move (e.g., snap) to a fully deployed position beyond 30°.

As noted above, FIG. 3A illustrates the forces acting on the second component 225 at the equilibrium point (e.g., when the deployment angle β is 30°). The forces acting on the second component 225 include an aerodynamic force FA acting normal to the second component 225, and reaction forces $F_1$ and $F_2$ acting at the second location 226b and the third location 226c, respectively. Because reaction force $F_2$ acts directly along the plane of the first component 224, it produces no moment at the first location 226a, and accordingly, no output moment is required by the actuator 250. Because the coupling at the second location 226b is a translating (e.g., sliding) coupling 229, no moment is provided at the second location 226b either. The vector components of the first and second forces in the Y direction (shown as $F_{1y}$ and $F_{2y}$, acting normal to the second component 225) add to counter the force in the opposite direction provided by the aerodynamic force FA. The vector components of the first and second forces in the X direction (shown as $F_{1x}$ and $F_{2x}$, acting parallel to the second component 225) are equal and opposite and therefore offset each other. Accordingly, the second component 225 is at equilibrium at a deployment angle β of 30°.

In some instances, it may be desirable to deploy the second component 225 by an amount greater than 30° before reaching equilibrium. For example, it may be desirable to delay the point at which equilibrium is reached in order to allow the deployment angle β to be higher at the fully deployed position. In still further particular arrangements, it may be desirable to do so without allowing the second component 225 to "snap" to its fully deployed position, e.g., if the actuator device 250 is easily overridden by the applied aerodynamic force FA. One approach to achieving this result is to select the actuator device 250 to resist the aerodynamic force FA tending to snap the second component 225 to its fully deployed position. Two other representative approaches are illustrated schematically in FIGS. 4A and 4B, respectively. In FIG. 4A, a resilient element 433 (e.g., a spring or other suitable device) is shown connected between the external flow body 210 and the second component 225. The resilient element 433 is configured to force the second component 225 toward the stowed position. Accordingly, the actuator device 250 must overcome the restoring force of the resilient element 433 as it moves the first and second components 224, 225 to a deployed position (shown as dotted lines). This in turn shifts the equilibrium point to a higher deployment angle. Accordingly, the second component 225 can be deployed to a greater angle β, as is shown by dashed lines in FIG. 4A, before the equilibrium point is reached. In other embodiments, the resilient element 433 can tend to move the second component 225 to another position, e.g., the equilibrium position, deployed position, or other position.

FIG. 4B illustrates another arrangement for achieving an increased maximum deployment angle β, in which a portion of the second component 225 moves along a curved (e.g., arcuate) guide path 430. In this arrangement, the second component 225 can also be moved to a greater deployment angle β before reaching equilibrium (e.g., β of about 60°) as a result of the curved guide path 430. For purposes of illustration, the actuator 451 shown in FIG. 4B is a linear actuator having a terminal end of the linearly displacing actuator part pivotably coupled to the second component 225 and a portion of the other actuator part pivotably coupled to the external flow body in a well-known manner, to allow for nonlinear movement of the component that couples the second component 225 to the curved guide path 430. In accordance with other embodiments, a rotary actuator can be employed, as was described above with reference to FIG. 2. The guide path 430 can have a simple arcuate shape, as shown in FIG. 4B, or other, possibly more complex shapes, in other embodiments, depending upon the particular design requirements.

Figure 5:
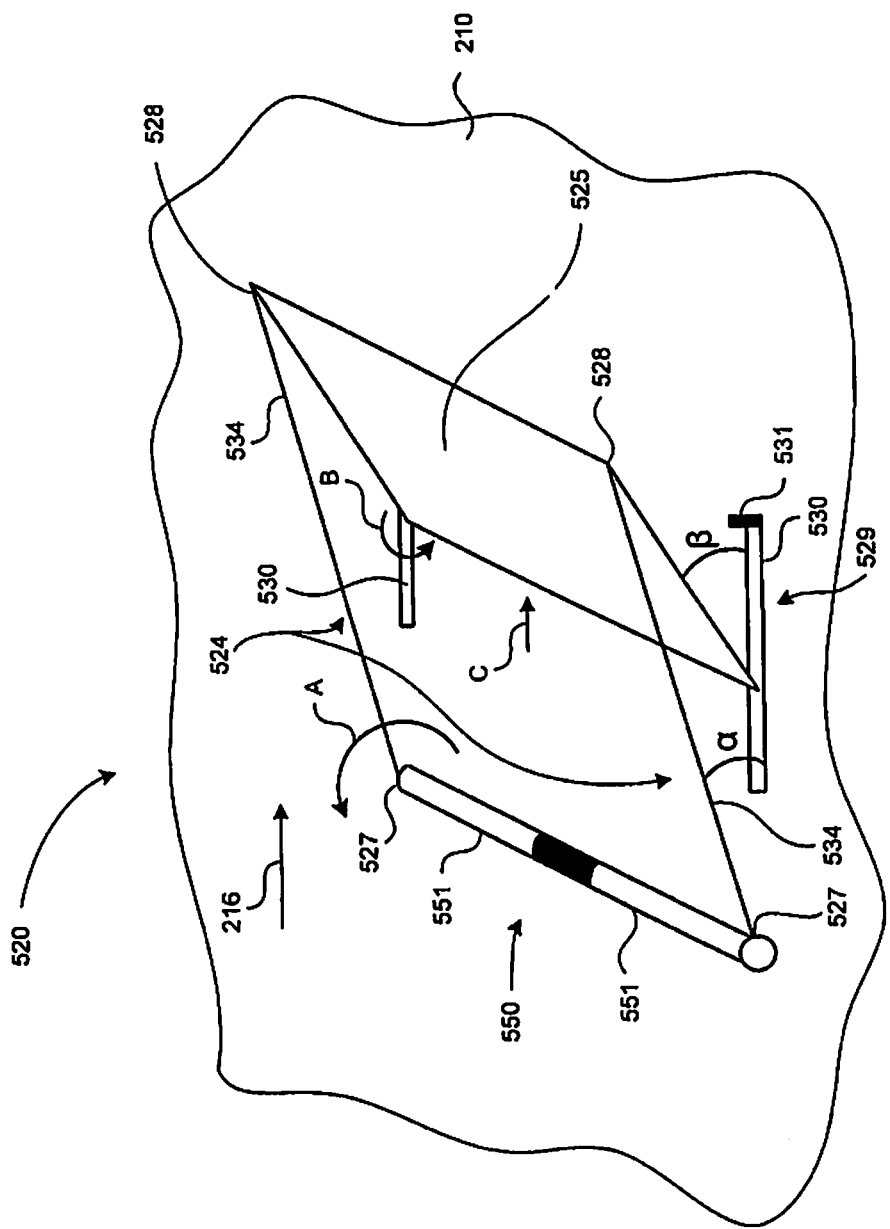
FIG. 5 is a partially schematic, isometric illustration of a deployable device having pivoting rods coupled to a translating component in accordance with an embodiment.

FIG. 5 illustrates a deployable device 520 configured in accordance with another embodiment. In this embodiment, the deployable device 520 includes a second component 525 coupled to a first component 524 that extends forward, rather than aft, of the second component 525. For example, the first component 524 can include two rods 534, each coupled to the external flow body 210 at a first hinge joint 527, and each coupled to the second component 525 at a second hinge joint 528. The second component 525 is coupled to the external flow body 210 with a translating coupling 529 and translates (e.g., slides) along guide paths 530 when deployed, until it reaches corresponding stops 531, one of which is visible in FIG. 5. The first component 524 can be driven by an actuator device 550 (generally similar to the actuator device 250 described above) that includes two rotary actuators 551. The rotary actuators 551 can include torque tube devices, shape memory alloy (SMA) devices, and/or other devices that apply a moment to the first component 524. As the second component 525 increases its deployment angle $\beta$, the force provided by the external flow 216 on the second component 525 increases, thereby reducing the load required by the actuator device 550 to further deploy the deployable device 520.

Figure 6:
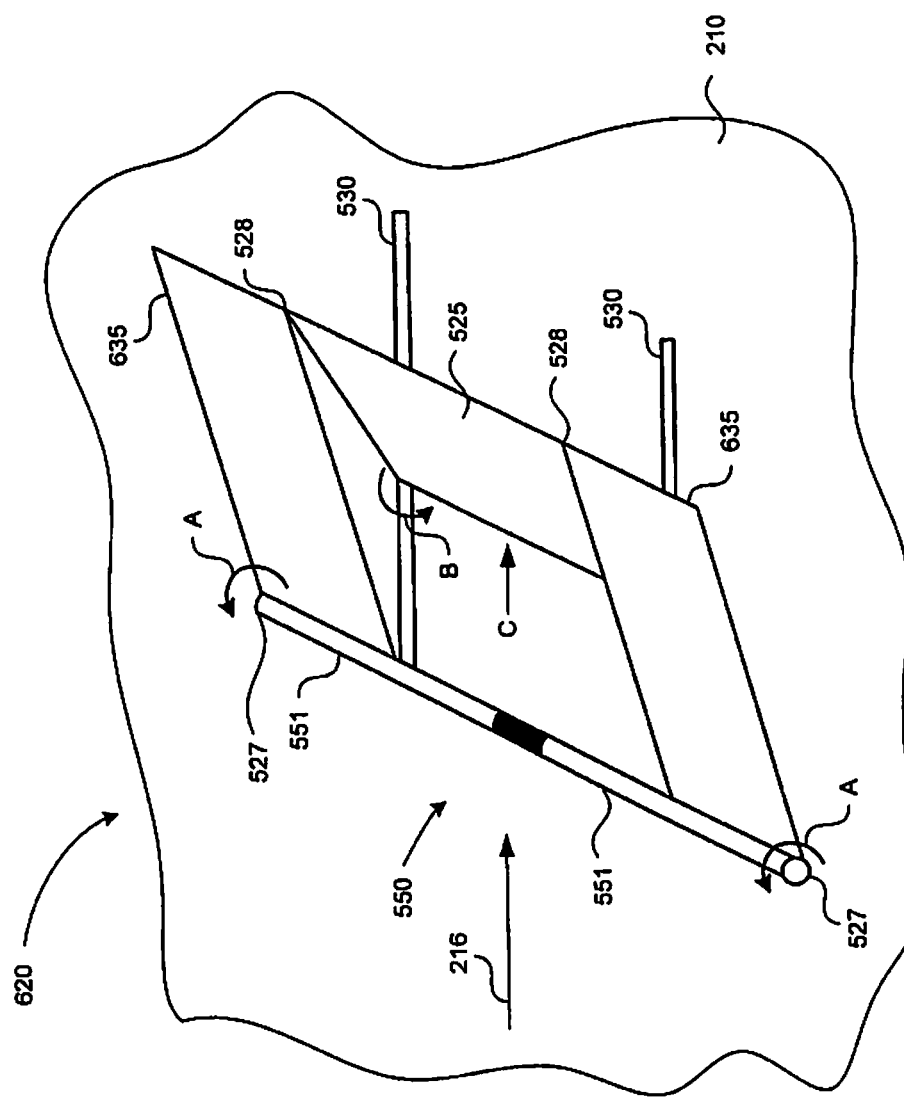
FIG. 6 is a partially schematic, isometric illustration of a deployable device having pivoting panels coupled to a translating panel in accordance with another embodiment.

FIG. 6 schematically illustrates another deployable device 620 that operates generally similarly to the deployable device 520 described above with reference to FIG. 5, but that includes panels 635 in place of the rods 534. The aerodynamic force applied by the external flow 216 on the panels 635 can act to drive the panels 635 (and therefore the second component 525) downwardly toward the stowed position, while the aerodynamic force acting on the second component 525 itself can act to deploy the second component 525. Accordingly, the panels 635 can delay the point at which equilibrium (discussed above with reference to FIGS. 3A and 3B) is reached and allow greater deployment angles for the second component 525 before equilibrium. The size of the panels 635 relative to the second component 525, as well as the locations of the hinge joint 528 and/or other design elements can be selected to provide for greater or lesser angles at the equilibrium point.

Figure 7:
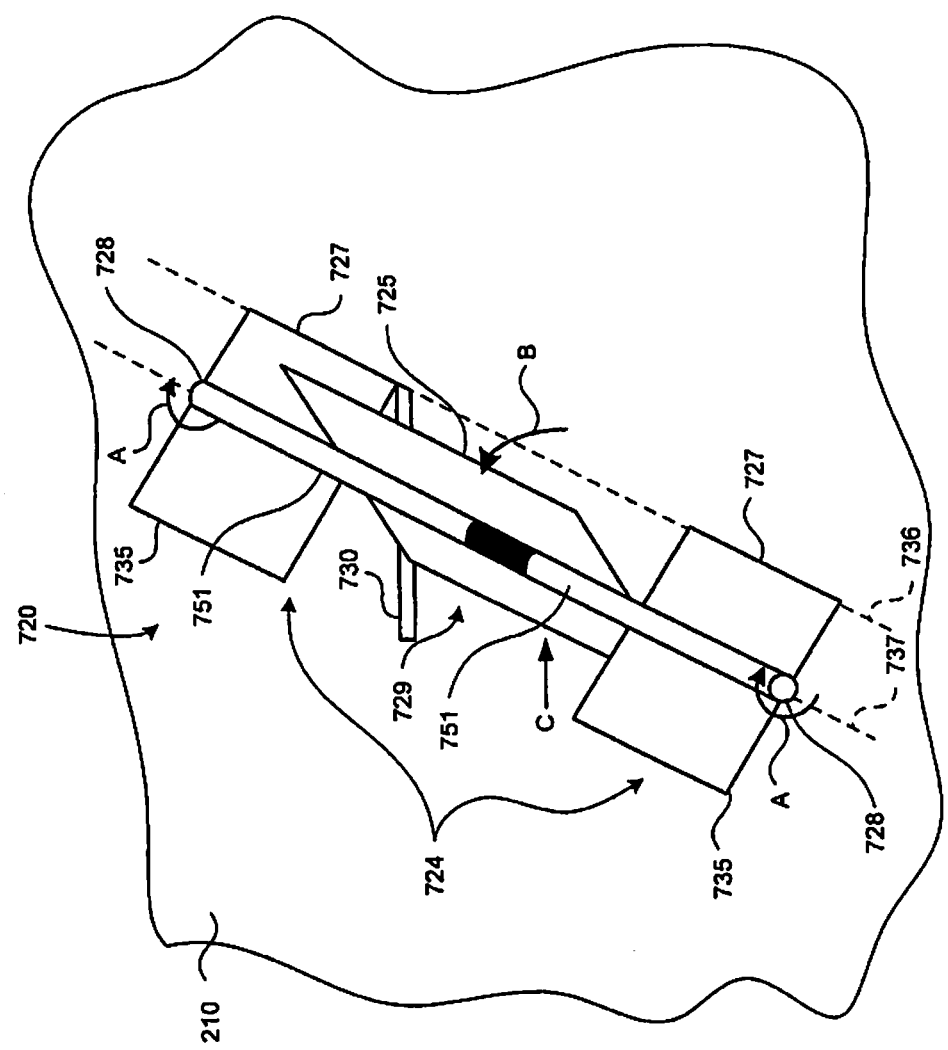
FIG. 7 is a partially schematic, isometric illustration of a deployable device having panels rotating in opposite directions in accordance with an embodiment.

FIG. 7 illustrates a deployable device 720 configured in accordance with yet another embodiment. In this embodiment, the deployable device 720 has a first component 724 that includes two panels 735. Each panel 735 is hingedly (e.g., pivotably) coupled to the external flow body 210 at a corresponding hinge joint 727 aligned along a first hinge line 736 (indicated by a dashed line). A second component 725 is translatably coupled to the external flow body 210 by a translating coupling 729, and is hingedly (e.g., pivotably) coupled to the first panels 735 via corresponding second hinge joints 728 aligned along a second hinge line 737 (indicated by a dashed line). Rotary actuators 751 are connected between the second component 725 and the panels 735 of the first component 724. As the rotary actuators 751 are activated, they rotate the first panels 735, as indicated by arrows A, which causes the second component 725 to rotate in the opposite direction, as indicated by arrow B, and slide or otherwise move along a guide path 730, as indicated by arrow C. The rotary actuators 751 can include torque tube devices, shape memory alloy (SMA) devices (such as the SMA actuators disclosed in U.S. Pat. No. 7,878,459, the disclosure of which is incorporated by reference herein in its entirety), and/or other devices that apply a moment to the first component 724 (i.e., panels 735). In this arrangement, the aerodynamic forces acting on the second component 725 and driving it toward the deployed position also act on the first component 724 to further increase the relative angles between the first and second components 724, 725, and therefore the deployment angle of the second component 725. Accordingly, this arrangement can be used where it is desirable to reach the equilibrium point at relatively low deployment angles and/or where it is desirable to position the actuators 751 at the second hinge line 737.

Figure 8:
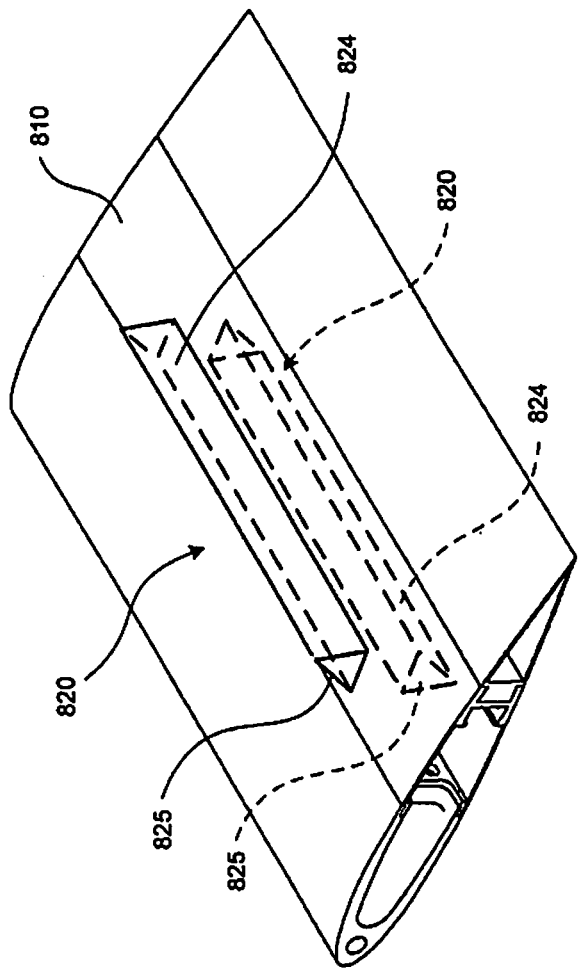
FIG. 8 schematically illustrates deployable devices installed on an airfoil-shaped external flow body in accordance with an embodiment.

Any of the foregoing deployed devices can be installed on aircraft wings as leading edge devices or trailing edge devices, as discussed above with reference to FIGS. 1 and 2. As was also discussed with reference to FIG. 1, these devices may be installed at other locations of the aircraft, for example, the horizontal stabilizer 102 and/or the vertical stabilizer 103. In still further embodiments, such devices may be installed on other lifting bodies. For example, FIG. 8 illustrates an external flow body 810 that can correspond to a helicopter rotor blade and that can include two deployable devices 820 installed on opposite surfaces of the rotor blade. Each of the deployable devices 820 can include a first component 824 and a second component 825. For purposes of illustration, the first and second components 824, 825 are generally similar to those described above with reference to FIG. 2, but in other embodiments, these components can have any of the foregoing configurations described above. The deployable devices 820 can act to reduce rotor noise rather than augment lift or provide for vehicle control.

In still further embodiments, devices generally similar to those described above with reference to FIGS. 1-8 can be applied to still further external flow bodies. In one example, such devices may be positioned on a body and deployed to "morph" the shape of the body. In another example, such devices can be installed on other vehicles exposed to an external air flow. In still further embodiments, such devices can be installed on submarines, boat hulls, and/or other surfaces that are immersed in a fluid flow stream other than air.

One feature of a deployable device in accordance with any of several of the foregoing embodiments is that the device can be configured so that, over at least a portion of the motion range of the device, the force applied to the device by the adjacent flow acts to reduce the load required by a corresponding actuator driving the device. This is unlike a typical conventional deployable device, for which the load applied by the external flow typically increases the load required by the actuator as the device deploys. An advantage of the foregoing feature described above with reference to representative embodiments disclosed herein is that it can reduce the size and power requirements of the actuator that drives the deployable device. As a result, the actuator can be easier to integrate with surrounding structures, and can consume less power when deploying the device to which it is coupled. In addition, the actuator can have a lower weight than conventional actuators used to drive similarly sized devices, and can accordingly reduce overall aircraft weight and/or increase aircraft operating efficiency.

From the foregoing, it will be appreciated that specific embodiments have been described herein for purposes of illustration, but that various modifications may be made in other embodiments. For example, while rotary actuators were discussed in the context of many of the foregoing embodiments, in other embodiments, other types of actuators (e.g., linear actuators) can be used. For example, a linear actuator of the type depicted in FIG. 4B could be substituted for the rotary actuators in the embodiment of FIG. 2 provided that the linear actuator is pivotably mounted to accommodate the nonlinear movement of the translating component 225.

Furthermore, the relative sizes of the various components discussed above, and the positions of the couplings discussed above can be selected and/or adjusted to produce selected results (e.g., selected maximum deployment angles and/or equilibrium angles).

Certain aspects described in the context of particular embodiments may be combined or eliminated in other embodiments. For example, a particular deployable device can include multiple-element second components and a single first component rather than multiple-element first components and a single second component. In another example, the resilient element 433 shown in FIG. 4A can be applied to other representative devices, as can the curved guide path 430 shown in FIG. 4B.

In any of the foregoing embodiments, the relative sizes, positions and coupling arrangements can be selected based on particular design requirements. Further, while advantages associated with certain embodiments have been described in the context of those embodiments, other embodiments may also exhibit such advantages, and not all embodiments need necessarily exhibit such advantages. Accordingly, the disclosure can include other embodiments not shown or described above.

The invention claimed is:

1. An external flow system, comprising:
   an external flow body comprising a first guide path;
   a deployable fluid dynamic device comprising a first guide path coupling, a first panel pivotably coupled to the external flow body, and a second panel movably coupled to the first guide path of the external flow body by the first guide path coupling and pivotably coupled to the first panel; and
   an actuator coupled to the external flow body and one of the first and second panels and having first and second operational states,
   whereby the fluid dynamic device is in a state of being stowed when the actuator is in the first operational state and in a state of being deployed when the actuator is in the second operational state, the second panel being subjected to pressure exerted by fluid when the fluid dynamic device is not stowed and the external flow body moves relative to that fluid in a direction such that the second panel leads the first panel.

2. The external flow system as recited in claim 1, wherein the actuator comprises a linear actuator pivotably coupled to the external flow body and the second panel, the linear actuator being retracted in the first operational state and extended in the second operational state.

3. The external flow system as recited in claim 1, wherein the actuator comprises a rotary actuator coupled to the external flow body and the first panel, the rotary actuator being unactivated in the first operational state and activated in the second operational state.

4. The external flow system as recited in claim 1, wherein the external flow body is part of a submarine or boat.

5. The external flow system as recited in claim 1, wherein over a first range of positions of the second panel, the load put out by the actuator increases, and over a second range of positions of the second panel, the load put out by the actuator device decreases, the second range of positions occurring after the first range during movement of the fluid dynamic device from the stowed configuration to the deployed configuration.

6. The external flow system as recited in claim 1, wherein a portion of the second panel that is coupled to the external flow body moves along a curved guide path during movement of the fluid dynamic device from the stowed configuration to the deployed configuration.

7. The external flow system as recited in claim 1, further comprising a resilient element positioned to oppose motion of the fluid dynamic device toward the deployed configuration.

8. The external flow system as recited in claim 1, wherein during deployment of the deployable fluid dynamic device, the angle between the first and second panels decreases.

9. The external flow system as recited in claim 1, wherein during deployment of the deployable fluid dynamic device, the distance of the location of the pivotable coupling of the first and second panels from the external flow body increases.

10. The external flow system as recited in claim 1, further comprising first and second hinge joints, wherein the first panel is pivotably coupled to the external flow body by the first hinge joint, and the first and second panels are pivotably coupled to each other by the second hinge joint.

11. The external flow system as recited in claim 1, wherein the external flow body is a lifting body of an aircraft.

12. The external flow system as recited in claim 11, wherein the lifting body comprises a wing, and the fluid dynamic device comprises a trailing edge device carried by the wing.

13. The external flow system as recited in claim 11, wherein the external flow body comprises a helicopter rotor blade.

14. The external flow system as recited in claim 1, wherein the external flow body further comprises a second guide path, and the deployable fluid dynamic device further comprises a second guide path coupling, the second panel being movably coupled to the second guide path of the external flow body by the second guide path coupling.

15. The external flow system as recited in claim 14, wherein the first and second guide paths are mutually parallel.

16. An external flow system, comprising:
    an external flow body comprising first and second guide paths;
    a deployable fluid dynamic device comprising first and second guide path couplings, a first panel pivotably coupled to the external flow body, and a second panel movably coupled to the first and second guide paths of the external flow body by the first and second guide path couplings respectively and pivotably coupled to the first panel; and
    an actuator coupled to the external flow body and to one of the first and second panels, the actuator being configured to cause deployment of the fluid dynamic device in a deployment operational state, during which the angle between the first and second panels will decrease and the distance of the location of the pivotable coupling of the first and second panels from the external flow body will increase.

17. The external flow system as recited in claim 16, wherein the actuator comprises a linear actuator pivotably coupled to the external flow body and the second panel, the linear actuator being retracted in the first operational state and extended in the second operational state.

18. The external flow system as recited in claim 16, wherein the actuator comprises a rotary actuator coupled to the external flow body and the first panel, the rotary actuator being unactivated in the first operational state and activated in the second operational state.

19. The external flow system as recited in claim 16, wherein the external flow body comprises a wing, and the fluid dynamic device comprises a trailing edge device carried by the wing.

20. The external flow system as recited in claim 16, wherein the external flow body comprises a helicopter rotor blade.

21. The external flow system as recited in claim 16, wherein the external flow body is part of a submarine or boat.

22. The external flow system as recited in claim 16, further comprising first and second hinge joints, wherein the first panel is pivotably coupled to the external flow body by the first hinge joint, and the first and second panels are pivotably coupled to each other by the second hinge joint.

* * * * *